United States Patent
Bovellan et al.

[11] Patent Number: 6,033,006
[45] Date of Patent: Mar. 7, 2000

[54] ARRANGEMENT IN A FUEL SYSTEM IN A VEHICLE

[75] Inventors: Kent Bovellan; Lars-Olof Hellgren; Christer Berntsson, all of Trollhattan, Sweden

[73] Assignee: Saab Automobile AB, Sweden

[21] Appl. No.: 09/022,994

[22] Filed: Feb. 12, 1998

[30] Foreign Application Priority Data

Feb. 12, 1997 [SE] Sweden .................................. 9700481

[51] Int. Cl.[7] .................................................. B60K 15/04
[52] U.S. Cl. ..................... 296/97.22; 296/189; 220/86.2
[58] Field of Search .............................. 296/97.22, 188, 296/189; 220/86.2, DIG. 33

[56] References Cited

U.S. PATENT DOCUMENTS

| | | | |
|---|---|---|---|
| 4,252,245 | 2/1981 | Kudo | 220/85 |
| 4,448,323 | 5/1984 | Hayashi et al. | 220/86 |
| 4,573,694 | 3/1986 | Goto et al. | 280/5 |
| 4,768,677 | 9/1988 | Kitsukawa | 220/288 |
| 5,090,760 | 2/1992 | Wheeler | 296/1.1 |
| 5,118,155 | 6/1992 | Koop | 296/1.1 |

FOREIGN PATENT DOCUMENTS

| | | | |
|---|---|---|---|
| 601025 | 1/1985 | Japan | 296/97.22 |
| 61-89122 | 7/1986 | Japan . | |
| 2299929 | 12/1990 | Japan | 220/86.2 |
| 2240096 | 7/1991 | United Kingdom | B60K 15/04 |

*Primary Examiner*—D. Glenn Dayoan
*Assistant Examiner*—Paul Chenevert
*Attorney, Agent, or Firm*—Ostrolenk, Faber, Gerb & Soffen, LLP

[57] ABSTRACT

In a fuel system of a vehicle a filler end of a fuel pipe is attached to the bodywork of the vehicle and accessible via filler opening in the side of the bodywork. The filler end is fastened to a bodywork element situated inside the side of the bodywork, which bodywork element supports a shield arranged around the filler end, which shield finishes at a certain distance from the side of the bodywork and during collisions protects a filler cap mounted on the fuel pipe.

20 Claims, 1 Drawing Sheet

ARRANGEMENT IN A FUEL SYSTEM IN A VEHICLE

BACKGROUND OF THE INVENTION

The present invention relates to an arrangement in a fuel system in a vehicle, especially an automobile, where a filler end of a fuel pipe connected to a fuel tank is attached to the body of the vehicle and is accessible via a tank opening arrangement in the side of the body, including a shield.

In a device of the above mentioned type it is usual for reasons of safety to have the filler end of the fuel pipe mounted in the bottom of a holder cup made of sheet metal which is welded to the side of the body around the filler opening therein. In this way a protected attachment of the fuel pipe, which often continues through the cabin space of the vehicle to the fuel tank, is obtained. One of the problems with such a design is that it requires a good fastening of the holder body to the side of the bodywork, with the consequential requirement for welding around the filler opening. This welding leads to a requirement for finishing to obtain an aesthetically attractive exterior side of the bodywork without unevenness. Another problem of a holder cup of the type mentioned is that its relatively large depth makes it difficult during painting to obtain a sufficiently good paint coverage in the whole of the holder cup in order to obtain a good corrosion protection around the fuel pipe.

The invention aims to provide an arrangement in a fuel system where the requirement for finishing of the bodywork is reduced at the same time as good corrosion protection and good safety against fuel leakage during a collision is obtained.

SUMMARY OF THE INVENTION

The object of the invention is achieved through the filler end being fastened to a bodywork element which is situated inside the side of the bodywork, and through the bodywork element supporting a shield arranged around the filler end which finishes at a predetermined distance from the side of the bodywork and has such an extension in the direction towards the side of the bodywork that the filler end and a filler cap mounted thereon are protected by the shield during a collision. According to a particularly advantageous embodiment, a tubular elastic seal, arranged around the filler end, is fastened to the bodywork element inside the shield and connected to the side of the bodywork around the filler opening.

Through mounting the filler end of the fuel pipe according to the invention a good security against fuel leakage during a rear end collision or a collision from the side is obtained. In this way it is also possible to provide a simpler fastening of the filler cap, where the problem of dents on the outside of the bodywork as a consequence of spot welding and the like can be avoided. A further advantage is that the problem of paint coverage inside a narrow sheet metal cup is eliminated.

Further advantages are evident from the following description.

DESCRIPTION OF THE PREFERRED EMBODIMENTS

Figure 1:
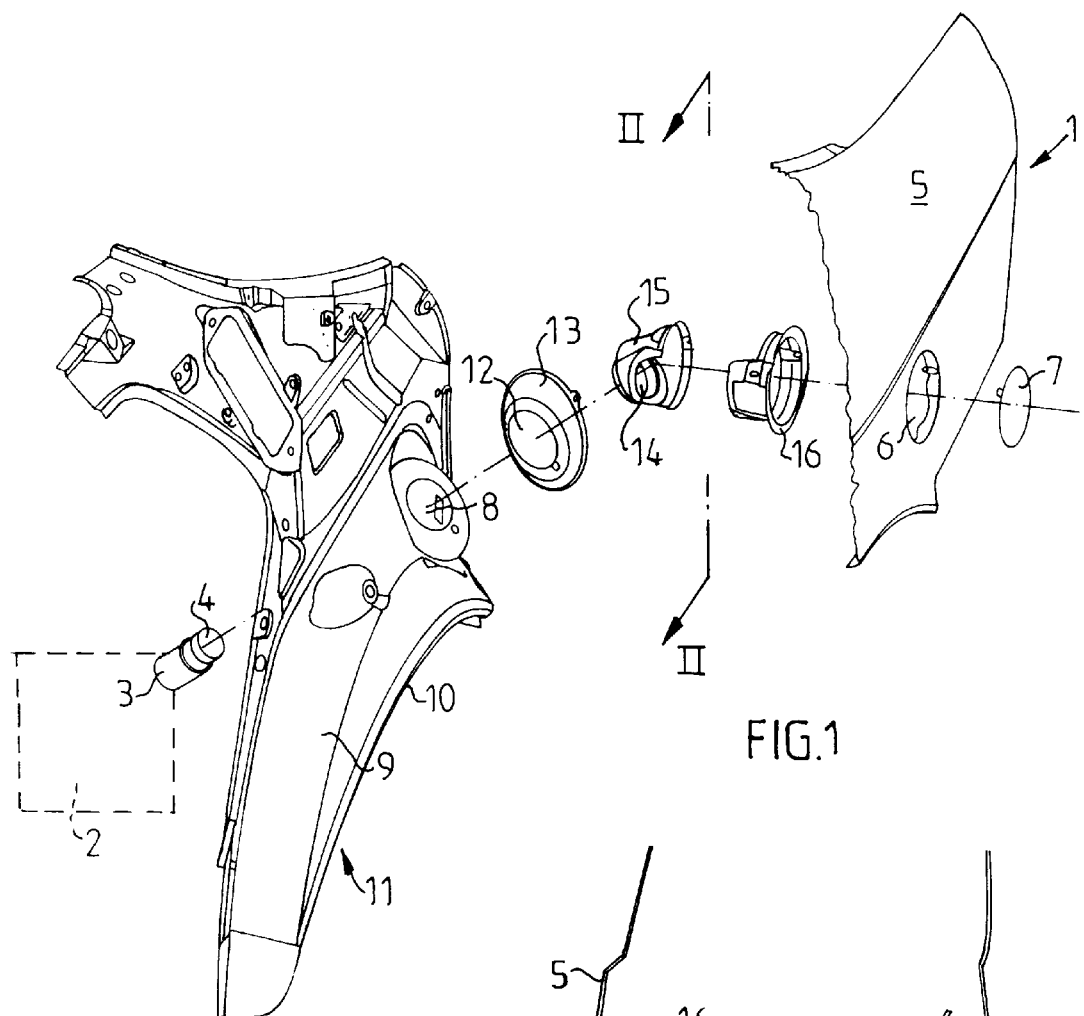
FIG. 1 shows an exploded view of a device according to the invention.
Figure 2:
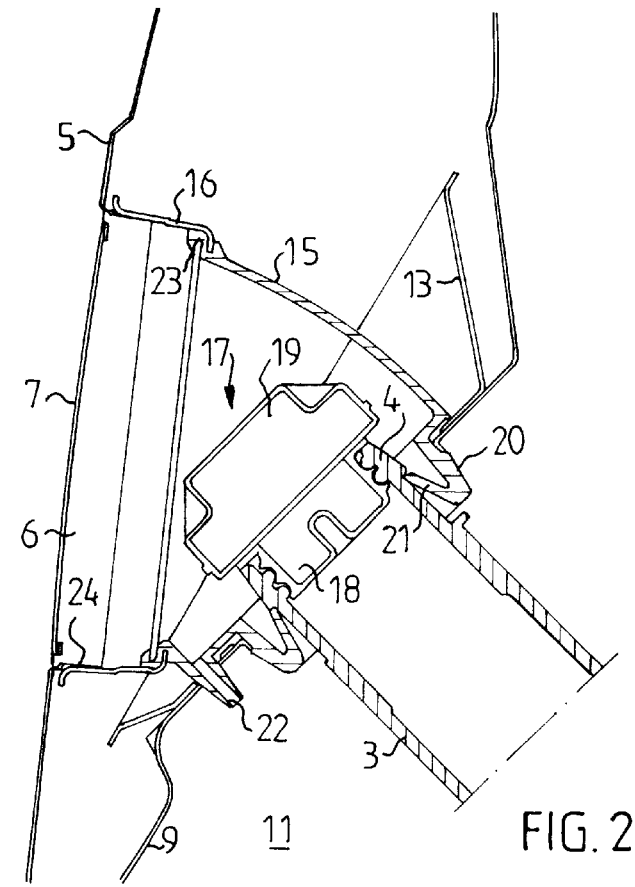
FIG. 2 shows a section II—II in FIG. 1 with the device in the mounted state.

A device according to the invention is shown on the drawing, on the one hand, before mounting in FIG. 1 and, on the other hand, after mounting in FIG. 2.

As is more closely evident from FIG. 1, a motor vehicle in the shape of an automobile, of which only a limited rear part 1 is shown, in the usual manner is provided with a fuel tank 2 with associated fuel pipe 3. In order to permit refuelling, a filler end 4 of the fuel pipe 3 is accessible via a filler opening 6 arranged in a side 5 of the bodywork which is closable by means of a pivotable filler cover 7.

The filler end 4 is intended to reach through an opening 8 in a bodywork element 9 which is situated inside the side 5 of the bodywork and which is connected thereto at certain places, i.a. at the edge 10 of a wheel housing 11 for a rear wheel (not shown) of the vehicle. The filler end 4 is intended to also reach through, on the one hand, an opening 12 in a shield 13 intended to be fastened onto the bodywork element 9, and on the other hand, an opening 14 in an elastic seal 15. By means of a holder 16 intended to be fastened on the inside of the side 5 of the bodywork, the seal 15 is connected to the side 5 of the bodywork around the filler opening 6. The filler cover 7 is designed for pivotable mounting on the holder 16.

As is evident from FIG. 2, where the components shown in FIG. 1 are mounted together, the outer part of the filler end 4 of the fuel pipe 3 is located inside the bowl-shaped shield 13. The filler end 4 is closed in a normal way by means of a filler cap 17, the filler cap 17 includes a sealing part 18, intended to be screwed into the filler end 4 and a grip 19. The sealing part 18 is located inside the bowl-shaped shield 13. The grip 19 partially extends outside the shield 13. For safety reasons, the filler cap 17 is so designed that at a certain stress, e.g. one which might be reached during a collision, the grip 19 can detach from the sealing part 18 without causing the sealing part 18 to leave its sealing position in the filler end 4. The grip 19 can therefore be permitted to partially be outside the shield 13 without jeopardizing the sealing function of the filler cap 17.

A collar 20 arranged around the lower end of the seal 15 is introduced into the openings 12 and 8 of the shield 13 and the bodywork element 9, respectively, and is by means of a locking means 21 in locking engagement with the filler end 4 of the fuel pipe 3 for fixing it relative to the bodywork element 9. At the bottom of the seal 15 there is a drain opening 22 for fuel overflow. At the end facing away from the collar 20 the seal 15 engages the holder 16 and is fixed to it around its circumference by means of a locking means 23 in the shape of a lock ring. The holder 16 is in turn fastened to an inwardly folded edge part 24 on the side 5 of the bodywork, e.g. by welding.

As a result of the fact that the side 5 of the bodywork is at a predetermined distance from the shield 13, in a light collision situation a certain deformation of the side 5 of the bodywork can take place without contact occurring between the shield 13 and the side 5 of the bodywork. In a more powerful collision situation, however, contact can occur but the shield 13 then effectively prevents the filler end 4 with the sealing part 18 of the filler cap 17 from being damaged. If damage, however, does occur during an extremely powerful collision, the placement of the fuel pipe 3 in a wheel housing 11 ensures that no fuel leaks out.

The size and shape of the shield 13 can vary dependent on the design of the vehicle in question, but it is important that the circumferential edge of the protection is stiff, which, for example, is achieved by the embodiment shown with an outwardly folded edge. It is also important that the shield 13 is attached sufficiently well on the bodywork element 9 in order to be able to fulfill its function. The material of the shield 13 is suitably sheet metal.

With the help of the seal 15 a relatively soft connection is obtained between the side of the bodywork, which via the holder 16 supports the filler cover 7, and the bodywork element 9. The holder 16 is therefore not subjected to very large forces and can be easily fastened invisibly at the edge part 24 of the side 5 of the bodywork. The seal 15, which is tubular and made of an elastic material, offers a durable surrounding of the filler end 4, where problems of paint coverage and the like do not occur.

What is claimed is:

1. A fuel filler system for providing access to a distal end of a fuel pipe of a vehicle from a position external to the vehicle, the fuel filler system being adapted to be mounted in a body portion of the vehicle, the body portion being defined by spaced inner and outer walls, the inner wall having an opening through which the distal end of the fuel pipe extends, the outer wall having an opening through which fuel may be supplied to the fuel filler system, the fuel filler system comprising:

a collar adapted to couple the distal end of the fuel pipe to the opening in the inner wall of the body portion of the vehicle;

a filler cap adapted to be removably coupled to the distal end of the fuel pipe; the filler cap including a sealing portion and a grip portion, the sealing portion sealing the distal end of the fuel pipe so that fuel cannot be removed from the distal end of the fuel pipe while the sealing portion engages the distal end of the fuel pipe, the grip portion enabling an operator to grip the filler cap and remove the sealing portion from the fuel pipe; and a rigid shield surrounding at least the sealing portion of the filler cap and the distal end of the fuel pipe for protecting both the distal end of the fuel pipe and the sealing portion of the filler cap during a collision so as to reduce the likelihood that the sealing portion of the filler cap will be removed from the distal end of the fuel pipe during a collision, the rigid shield being adapted to be coupled to the inner wall of the body portion of the vehicle and extending towards but being spaced from and out of contact with the outer wall of the body portion of the vehicle.

2. The fuel filler system of claim 1, wherein the grip portion of the filler cap is designed to be separated from the sealing portion of the filler pipe when a predetermined force is applied to the grip portion without removing the sealing portion from the distal end of the fuel pipe.

3. The fuel filler system of claim 1, further including an elastic seal element coupled to the inner wall of the body portion around the distal end of the fuel pipe and extending from the inner wall towards the outer wall, the elastic seal element being located inside the shield around the filler end.

4. The fuel filler system of claim 3, further including a holder adapted to connect the elastic seal element to the outer wall in an area surrounding the opening in the outer wall.

5. The fuel filler system of claim 3, wherein the seal element is made of rubber.

6. The fuel filler system of claim 5, wherein the shield is made of metal.

7. The fuel filler system of claim 3, wherein the shield has a generally bowl shape.

8. The fuel filler system of claim 7, wherein the bowl shape of the shield is lopsided with one side of the bowl having a greater height than the opposite side of the bowl.

9. The fuel filler system of claim 8, wherein the seal element is also a lopsided bowl shape.

10. The fuel filler system of claim 9, wherein the collar extends from the seal element.

11. A combination comprising:

a body portion of a motor vehicle, the body portion being defined by spaced inner and outer walls, the inner wall having an opening through which the distal end of a fuel pipe of the vehicle extends, the outer wall having an opening through which fuel may be supplied;

a collar coupling the distal end of the fuel pipe to the opening in the inner wall of the body portion of the vehicle;

a filler cap which is removably coupled to the distal end of the fuel pipe; the filler cap including a sealing portion and a grip portion, the sealing portion sealing the distal end of the fuel pipe so that fuel cannot be removed from the distal end of the fuel pipe while the sealing portion engages the distal end of the fuel pipe, the grip portion enabling an operator to grip the filler cap and remove the sealing portion from the fuel pipe; and a rigid shield surrounding at least the sealing portion of the filler cap and the distal end of the fuel pipe for protecting both the distal end of the fuel pipe and the sealing portion of the filler cap during a collision so as to reduce the likelihood that the sealing portion of the filler cap will be removed from the distal end of the fuel pipe during a collision, the rigid shield being attached to the inner wall of the body portion and being spaced from and out of contact with the outer wall of the body portion.

12. The combination of claim 11, wherein the grip portion of the filler cap is designed to be separated from the sealing portion, of the filler pipe when a predetermined force is applied to the grip portion without removing the sealing portion from the distal end of the fuel pipe.

13. The combination of claim 11, further including an elastic seal element coupled to the inner wall of the body portion around the distal end of the fuel pipe and extending from the inner wall towards the outer wall, the elastic seal element being located inside the shield around the filler end.

14. The combination of claim 13, further including a holder connecting the elastic seal element to the outer wall in an area surrounding the opening in the outer wall.

15. The combination of claim 13, wherein the seal element is made of rubber.

16. The combination of claim 15, wherein the shield is made of metal.

17. The combination of claim 13, wherein the shield has a generally bowl shape.

18. The combination of claim 17, wherein the bowl shape of the shield is lopsided with one side of the bowl having a greater height than the opposite side of the bowl.

19. The combination of claim 18, wherein the seal element is also a lopsided bowl shape.

20. The combination of claim 19, wherein the collar extends from with the seal element.

* * * * *